Patented Oct. 31, 1922.

1,434,297

UNITED STATES PATENT OFFICE.

KARL LENDRICH, OF HAMBURG, GERMANY.

PROCESS FOR THE MANUFACTURE OF COFFEE SUBSTITUTES FROM CEREALS AND THE MALT OF CEREALS.

No Drawing.  Application filed January 7, 1920. Serial No. 350,050.

*To all whom it may concern:*

Be it known that I, Dr. KARL LENDRICH, professor, a citizen of the German State, residing at Hamburg, in the State of Hamburg, Germany, have invented certain new and useful Improvements in Processes for the Manufacture of Coffee Substitutes from Cereals and the Malt of Cereals (for which I have filed applications in Germany, April 28, 1917, patented March 23, 1921, No. 337168; in Austria, November 9, 1917, patented October 27, 1921, No. 87134; in Hungary, November 17, 1917, patented October 4, 1921, No. 17433/1921; in Denmark, May 14, 1918, patented October 15, 1919, No. 25775; in Germany, August 19, 1918, patented April 13, 1921, No. 337917; in Switzerland, August 30, 1918, patented February 28, 1919, No. 81131; in Austria, August 31, 1918, patented October 27, 1921, No. 87135; in Hungary, September 4, 1918 (not yet patented); in Norway, September 7, 1918, patented June 13, 1921, No. 32826; in Holland, September 9, 1918, patented December 24, 1921, No. 6674; in Denmark, September 11, 1918, patented September 22, 1920, No. 27628; in Sweden, September 11, 1918, patented April 7, 1921, No. 49016; in France, May 26, 1919, patented April 29, 1920, No. 505162; in Great Britain, August 12, 1919, patented November 12, 1920, No. 131304; and in Great Britain, August 18, 1919, patented November 18, 1920, No. 153971), of which the following is a specification.

In the manufacture of coffee substitutes from cereals and the malt of cereals by roasting these products, the object is to convert the organic combinations contained therein by nature, or produced by the malting process, and especially the starch that constitutes the principal component, in such a manner that products are obtained which result, when prepared in the kitchen, in a drink which is as far as possible like genuine coffee in colour, smell and taste.

According to experience, the conversion so obtained is by no means such a uniform or perfect one in the direction aimed at, as in the case of genuine coffee. According to the time taken in roasting and the temperature employed, more or less large quantities of the starch are changed only in a small degree, while other components, such as maltose and albumins, occasionally are disintegrated too much. Consequently the products not infrequently have undesirable properties which show themselves in various directions and especially in the infusion prepared as a drink.

The reason of this is to be found in the anatomical structure of the cereal grain, as the flour body containing starch is closely surrounded by a thick wall of gluten and in addition to this by the seed and fruit husk, and also in the small loosening of the texture when roasting and the deficient heat conduction due to it.

The well known special processes for the manufacture of coffee substitutes from cereals and the malt of cereals have for their chief object to render the starch of the flour body in these products soluble before roasting by a certain treatment with the object of doing away with the said defects.

The object of the present invention is to provide a process by which in cereals and the malt of cereals, not only the starch, but at the same time the albumins and the cellulose are rendered soluble up to the degree required for the present purpose, without the structure of the fruit undergoing any alteration worth mentioning. This gives a further advantage, that in the subsequent roasting a uniform alteration of the texture and cell contents of the products result, which is even apparent to the eye, and that coffee substitutes with a good yield of extract are obtained, having a pronounced coffee aroma and the desired clean bitter aromatic flavour.

The "opening" of the entire fruit according to this process rests partly on the knowledge that, just as with genuine coffee, the food value of the products does not depend on a single component, but on the effect of the sum of all the components, which has up to now not been taken into account sufficiently, a rendering soluble of the starch only having been taken into consideration.

The improved process itself rests on the well known fact that not only starch but also albumins and cellulose may be rendered soluble, not only with water, to which certain quantities of alkalies or acids have been added, but also with water alone, high temperatures being employed, more particularly produced by pressure. The many experiments dealing with the employment of these methods for the present invention of the simultaneous rendering soluble of the starch, the albumins and the cellulose in cereals and the malt of cereals, have resulted in the discovery that the use of water at high temperatures produced by pressure, or more correctly of steam under pressure, not only completely suffices for obtaining under certain conditions the alterations of the components mentioned as being requisite for the purpose, but also provides certain advantages over the additional use of alkalies and acids, there being in this case no danger of a conversion which goes too far and is combined with detrimental consequences for the products.

On the other hand it was discovered that by small quantities of neutral or nutritive salts, such as sodium chloride and calcium chloride and the like, the rendering soluble is somewhat speeded up. Such additions can however be dispensed with, since these are of no advantage to the finished products.

The amount of water used in the process is comparatively small, so that after the treatment is finished, an almost dry and externally unchanged product is obtained.

The cleaned, scoured and air-dried cereals, or malt of the cereals, are preferably uniformly moistened with the requisite amount of water, or they receive it completely or in part through the steam acting on them during the rendering soluble.

With the rendering soluble of all the component parts of the fruit, the observation of which during the process gives no particular difficulties, there has been obtained a good loosening and conduction of heat so that during the subsequent roasting in the well known manner at a moderate heat the uniform conversion to the roasted products, which are specially valued for their taste, is easily accomplished.

*Example.*

100 kgs. of cleaned, scoured, air-dried cereals or the malt of cereals are placed either directly or after being uniformly moistened beforehand with about 5–10% of water, which in certain circumstances may contain 1–2, 5% sodium chloride or calcium chloride, in a suitable pressure boiler. In the former case, the mass which is kept in motion is treated with streaming water vapour of low temperature, until it has attained the requisite degree of moisture. Thereupon the mass which has been uniformly and thoroughly moistened in one way or the other is subjected in a completely sealed apparatus, while kept in constant motion, to the action of dry steam under pressure, during which the pressure is gradually raised from one to three atmospheres, care having been taken by a suitable arrangement, that any condensed water that may have formed does not come in contact with the mass.

The requisite higher temperature and the pressure made necessary thereby can be obtained also in an apparatus provided with double walls, by steam working indirectly.

When the process is carried out correctly the rendering soluble is generally finished after 1½ to 2 hours. Samples must be taken from time to time for ascertaining the progress of the rendering soluble and finally the time, when this is completed for the intended purpose.

After the rendering soluble has been completed, the steam is shut off. When the pressure has fallen the valves are opened and the mass which is still hot is placed on a cooling sieve, so that the moisture adhering externally may be sucked off by means of an exhauster. The further roasting of the products which have been rendered soluble is then carried out in the well known manner.

Although the stimulating effect of genuine roasted coffee and the best coffee substitutes also depends on the odoriferous and flavouring principles, it is certain that the peculiar effect produced by roasted coffee upon the gustatory nerves and more particularly upon the central nervous system, depends mainly on the amount of contained caffein.

The embodiment of caffein in coffee substitutes or its addition in the form of coatings is not of itself difficult. It has, on the other hand, not been possible so far to embody the caffein in the substitute in the same manner as it is embodied as a constituent in genuine raw and roasted coffee.

This result is obtained by an amended execution of the improved process according to the present invention.

According to this amended execution of the process the raw material, more particularly cereals and the malt of cereals, is thoroughly moistened with a solution in water of the requisite amount of caffein, and is then heated in a suitable apparatus with constant motion and pressure, preferably by being treated with steam under pressure, until a sufficient "opening" of the starch, albumins and cellulose is effected, and at the same time, the caffein solution has become absorbed, and the whole grain has become uniformly penetrated.

In the material so treated the caffein is incorporated in the cells of the tissue. This incorporation depends, exactly as in the case of the caffein in the genuine coffee bean, on an absorption-effect which has nothing to do with the further question whether the caffein is present in chemical combination as chlorogenate potassium caffein, or as a free base in the coffee. (See K. Lendrich and E. Nottbohm, "Verfahren zur Bestimmung des Koffeins im Kaffee" Zeitschrift für Untersuchung der Nahrungs- und Genussmittel, 1909, vol. 17, part 5, page 265.)

During the roasting of the material after it has been through the above preliminary treatment there is only a very small loss of caffein, just as is known to be the case with coffee. (See K. Lendrich and E. Nottbohm, "Ueber den Koffeingehalt des Kaffees und den Koffeinverlust beim Rösten des Kaffees", Zeitschrift für Untersuchung der Nahrungs- und Genussmittel 1909, vol. 18, part 5.) The uniform distribution of the caffein also remains unaltered in the roasted product.

That the caffein is in the same state in the manufactured coffee substitute as in genuine coffee follows from its behaviour when it is treated with caffein-solvents, such as benzene (benzol), chloroform, carbon-tetrachloride. The caffein can no more be extracted directly from the roasted coffee substitute by means of these liquids than it can from genuine roasted coffee beans. As soon, however, as the adsorption effect is removed by moistening the product with water, the caffein is easily taken up by the above mentioned solvents.

One example of the improved process is as follows:—

100 kilos of cleaned, scoured, air-dried cereals or the malt of cereals are moistened with about 10% of hot water in which 0.5% of caffein (reckoned on the raw material), or a corresponding amount of a caffein salt is dissolved. 1 to 2% of common salt or calcium chloride may be added to the caffein solution.

The material, which is preferably thoroughly moistened in heat, is thereupon exposed in a pressure apparatus while kept constantly in motion, to the action of dry pressure steam; generally one to three atmospheres above atmospheric is sufficient. During this steaming, care must be taken that any water formed by condensation does not come in contact with the material.

The steaming is continued with until it is seen from samples that a uniform "opening" of the grain has been obtained, which usually occurs in from 1 to 1½ hours.

When the "opening" is completed the steam is shut off, and after the pressure has dropped, the valves are opened, and the material while still hot is spread on a cooling sieve. The grains are then roasted as they are, or after being previously dried.

The "opening" may also be effected by dissolving the caffein in a quantity of water just sufficient for "opening" and penetrating the grains, and by the material, while kept in motion, being heated with the liquid in the closed pressure apparatus.

That there is a thoroughly uniform distribution of the caffein in the roasted product, and that the loss of caffein by roasting is only very slight, is seen on testing the samples taken.

If, for instance, 1% or, 0.5% of caffein have been added to the raw materials, the roasted products will contain about 1.1 to 1.2% or 0.55 to 0.6% caffein according to the temperature of the roasting. Thus the conditions are the same as in the case of genuine roasted coffee. (See the above quoted article on the caffein contents of coffee.)

The improved process not only permits of obtaining a completely uniform distribution of the caffein in the material, and the avoidance of any appreciable loss of caffein in the roasting, but also secures the greatest possible similarity of the fragrance and flavour procured by roasting to those of roasted coffee.

The infusion prepared with boiling water from the ground roasted product is exactly like that of genuine coffee, and replaces the latter in every respect as regards its palatableness, in a manner which has never before been obtained.

In the same manner as cereal grain and the malt of cereal grain, other grain, more particularly raw materials containing starchy flour, for instance lupins (freed from their bitter principles) may be satisfactorily treated by the improved process for the production of coffee substitutes containing caffein.

I claim:—

1. A process for the manufacture of coffee substitutes from cereals and the malt of cereals consisting in treating the uniformly moistened mass with continuous agitation in a closed room with steam under pressure, increasing the pressure gradually until the starch, the albumins and the cellulose have been rendered sufficiently uniformly soluble and roasting the mass.

2. A process for the manufacture of coffee substitutes from cereals and the malt of cereals consisting in moistening the mass to be treated with a weak solution of nutritive (neutral) salts, treating said moistened mass with continuous agitation in a closed room with steam under pressure, increasing the pressure gradually until the starch, the albumins and the cellulose have been rendered sufficiently uniformly soluble and roasting the mass.

3. A process for the manufacture of coffee substitutes from cereals and the malt of cereals consisting in moistening the mass to be treated with a weak solution of calcium chloride, treating said moistened mass with continuous agitation in a closed room with steam under pressure, increasing the pressure gradually until the starch, the albumins and the cellulose have been rendered sufficiently uniformly soluble and roasting the mass.

4. A process for the manufacture of coffee substitutes from cereals and the malt of cereals consisting in moistening the mass to be treated with a caffein solution, treating said moistened mass with continuous agitation in a closed room with steam under pressure, increasing the pressure gradually until the starch, the albumins and the cellulose have been rendered sufficiently uniformly soluble and roasting the mass.

5. A proess for the manufacture of coffee substitutes from cereals and the malt of cereals consisting in moistening the mass to be treated with a solution of caffein and nutrive (neutral) salts, treating said moistened mass with continuous agitation in a closed room with steam under pressure, increasing the pressure gradually until the starch, the albumins and the cellulose have been rendered sufficiently uniformly soluble and roasting the mass.

6. A process for the manufacture of coffee substitutes from cereals and the malt of cereals consisting in moistening the mass to be treated with a solution of caffein and a small quantity of calcium chloride, treating said moistened mass with continuous agitation in a closed room with steam under pressure, increasing the pressure gradually until the starch, the albumins and the cellulose have been rendered sufficiently unisoluble and roasting the mass.

In testimony whereof I affix my signature in presence of two witnesses.

Professor Dr. KARL LENDRICH.

Witnesses:
H. BOHNISKCY,
WALTER LUCHEN.